United States Patent

[11] 3,542,176

[72] Inventors William J. Foxwell
 Troy;
 William F. Lomas, Southfield, Michigan
[21] Appl. No. 771,221
[22] Filed Oct. 28, 1968
[45] Patented Nov. 24, 1970
[73] Assignee Ford Motor Company
 Dearborn, Michigan
 a corporation of Delaware

[54] MULTIPLE RANGE POWER TRANSMISSION MECHANISM
 4 Claims, 3 Drawing Figs.
[52] U.S. Cl. .................................................... 192/3.51;
 74/333, 74/363
[51] Int. Cl. ........................................................F16d 67/00;
 F16h 3/08, F16h 3/22
[50] Field of Search............................................ 74/363,
 333; 192/3.5, 53.6

[56] References Cited
UNITED STATES PATENTS

| | | | |
|---|---|---|---|
| 2,647,596 | 8/1953 | Cook............................ | 192/3.5 |
| 2,753,728 | 7/1956 | Kebel........................... | 74/333X |
| 2,805,743 | 9/1957 | Keese........................... | 192/3.5 |
| 2,890,772 | 6/1959 | Bixby........................... | 192/3.5 |
| 2,978,083 | 4/1961 | Henyon........................ | 192/53X |
| 3,088,336 | 5/1963 | Fodrea......................... | 74/333X |
| 3,149,498 | 9/1964 | Mack........................... | 74/364 |
| 3,184,984 | 5/1965 | Erdman et al. ............... | 74/363X |
| 3,192,788 | 7/1965 | Fodrea......................... | 74/333X |
| 3,308,673 | 3/1967 | Gardner....................... | 74/333 |
| 3,419,121 | 12/1968 | Stott............................ | 192/53 |

*Primary Examiner*—Arthur T. McKeon
*Attorneys*—John R. Faulkner and Donald J. Harrington ABSTRACT: A multiple ratio transmission mechanism for agricultural and industrial tractors including a geared range selector assembly capable of providing a low speed creeper operating range, an intermediate speed field operating range, a high speed transport operating range, as well as a reverse drive range, main ratio selecting gearing adapted to provide four transmission drive ratios in each of the selected operating ranges, and independent operators for selecting separately the speed ratios in the operating ranges.

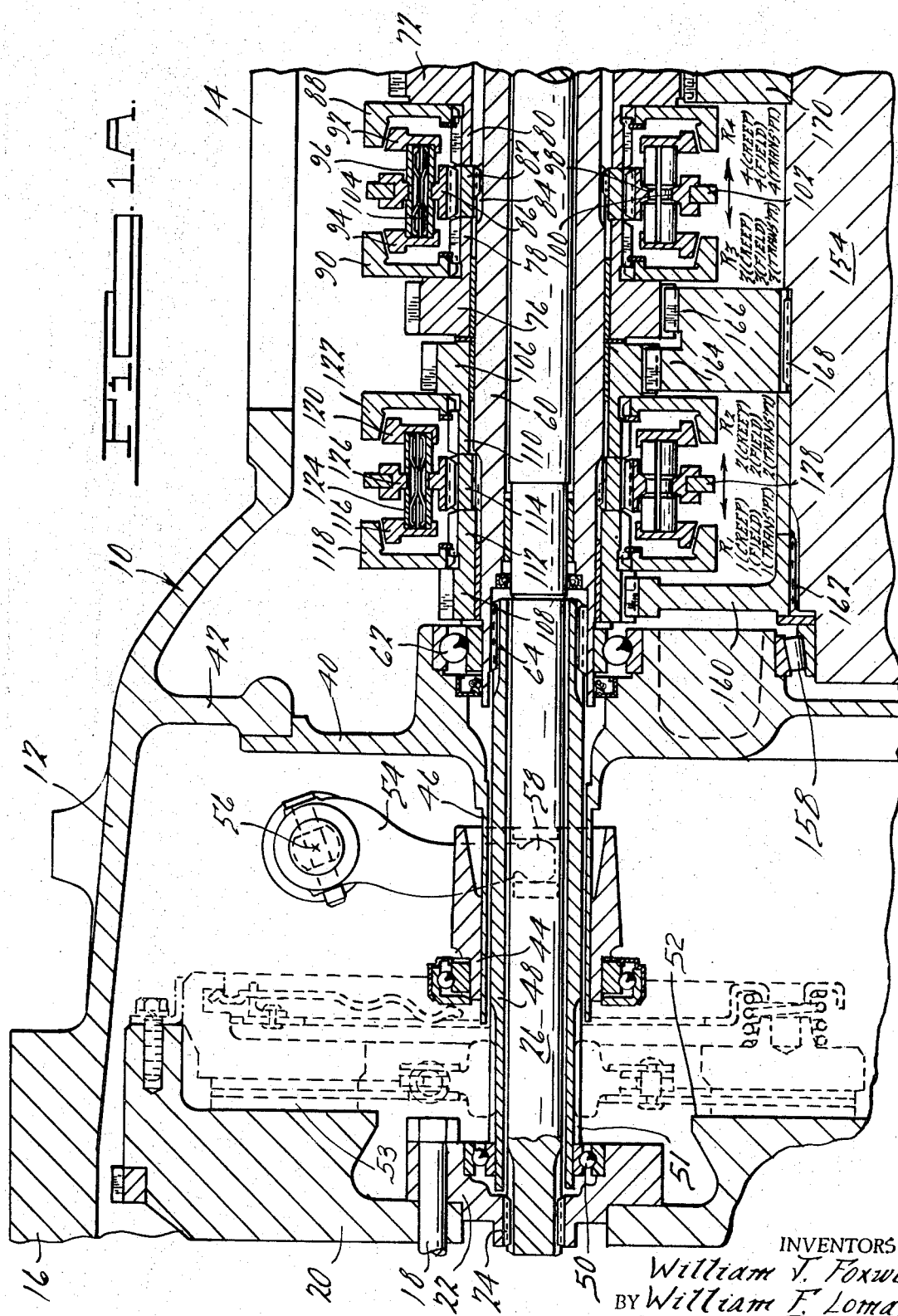

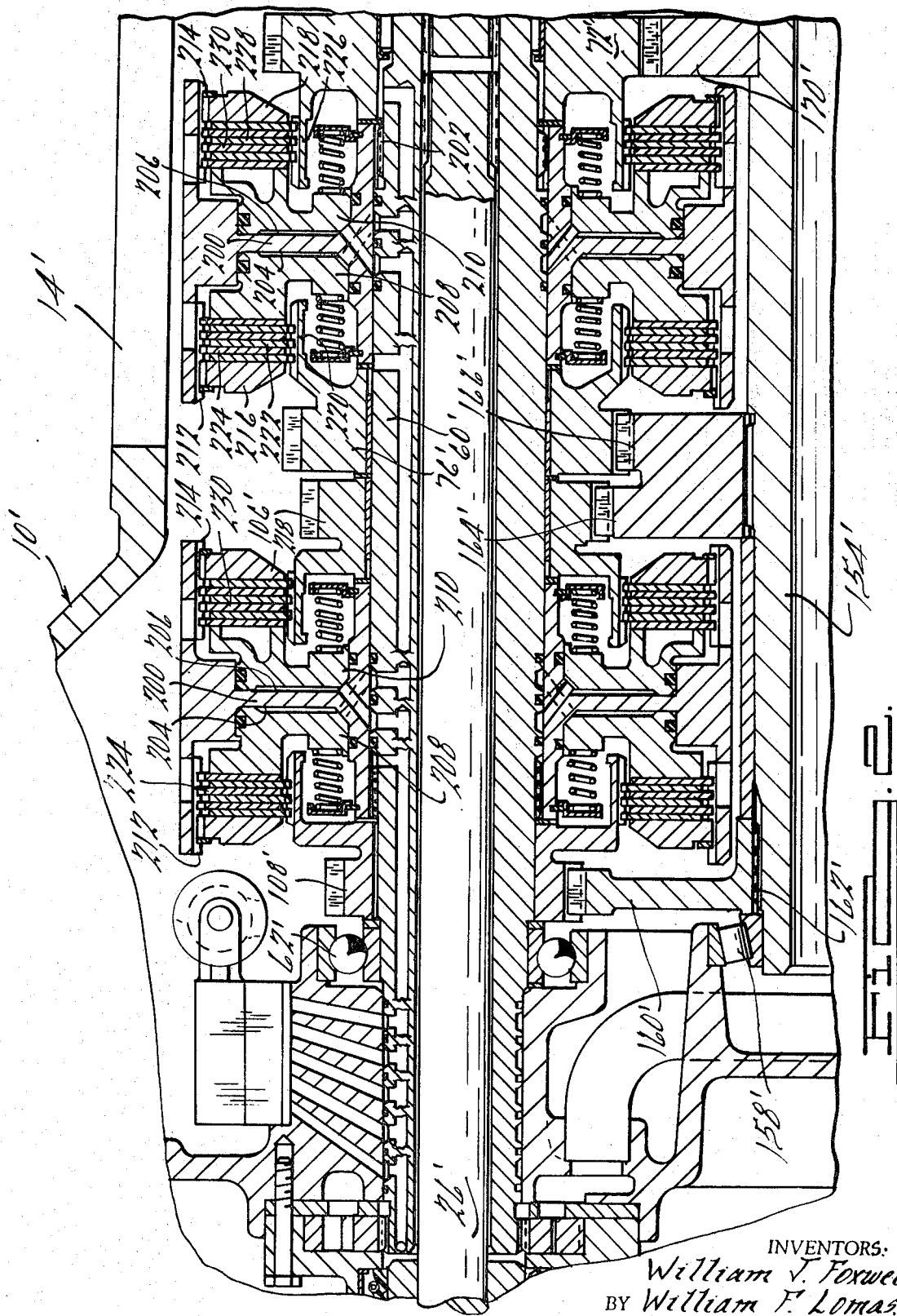

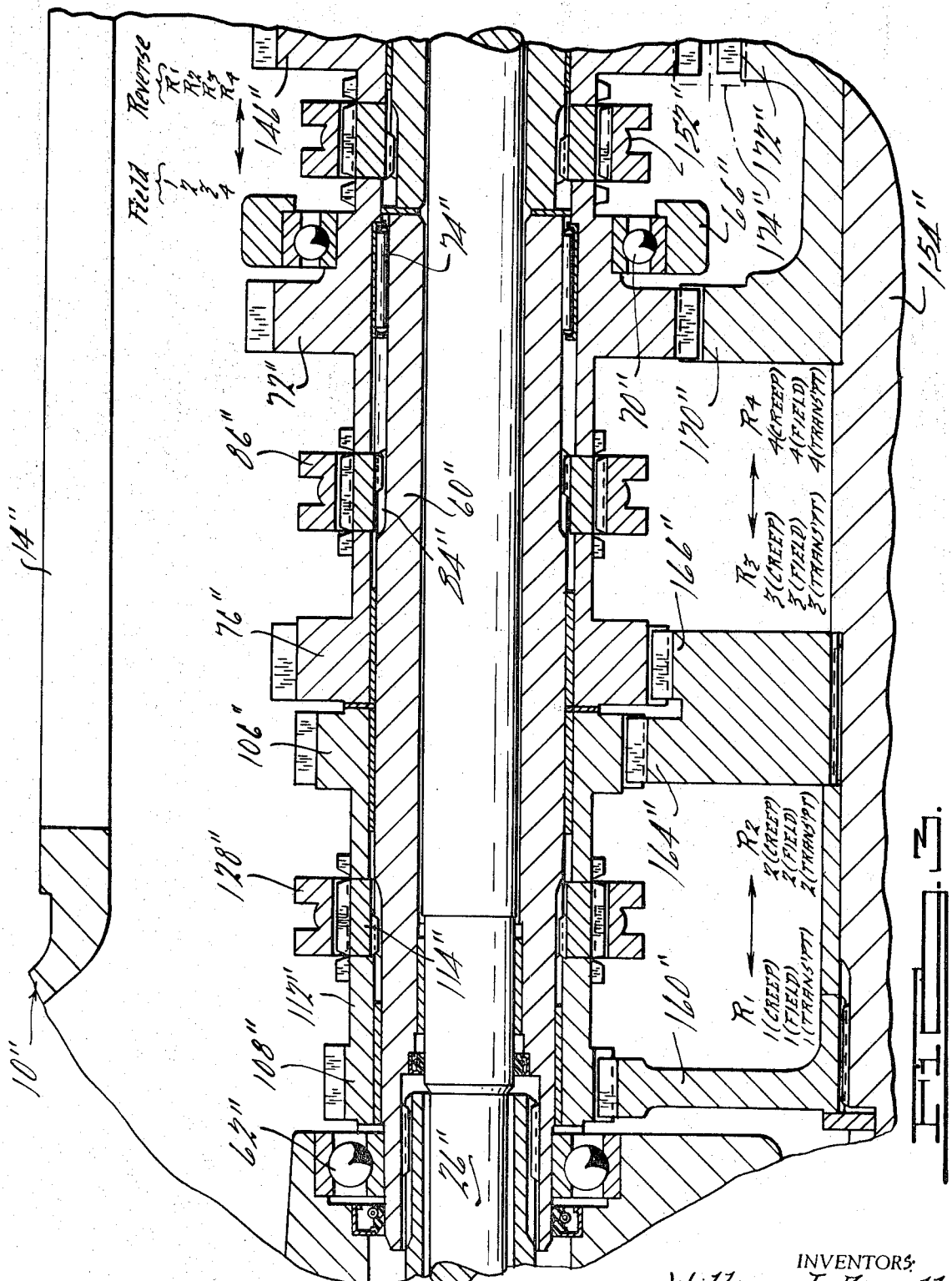

3,542,176

MULTIPLE RANGE POWER TRANSMISSION MECHANISM

GENERAL DESCRIPTION OF THE INVENTION

The improved transmission mechanism of our invention is adapted to be used in the driveline of agricultural and industrial tractors as well as certain types of heavy trucks and construction vehicles. It includes stepped ratio gearing having a countershaft and a main torque delivery shaft. Main transmission speed ratio gears, which establish the various torque delivery paths, are mounted for rotation about the axis of the main shaft. These continuously engage gear elements mounted on the countershaft. By engaging and disengaging the elements of the main gearing with respect to the main torque delivery shaft, ratio changes can be accomplished.

The disposition of the elements of the main transmission gearing and the elements of the countershaft gearing is such that synchronizer clutch elements and power shift clutch elements can be used interchangeably without altering either the gearing arrangement or the transmission housing for the gearing. Regardless of whether the synchronizer clutches or power shift clutches are used to establish ratio changes, the range selector gearing cooperates with the speed ratio change gearing.

Multiple ratio changes are available for each of the selected operating ranges. We have shown separate embodiments, one having synchronizer clutches and the other having disc clutches with a fluid pressure operated servo for establishing and disestablishing clutch engagement. In the latter, a control valve for the servos is under the control of the vehicle operator.

If it is desired to eliminate the synchronizer clutches and the servo operated power shift disc clutches, they can be replaced by manually operated dog clutches if ratio changes within each operating range are not desired while the vehicle is in motion. In this case, ratio changes can be accomplished only when the vehicle is stopped. This alternate arrangement also has been disclosed in the specification.

BRIEF DESCRIPTION OF THE FIGURES OF THE DRAWINGS

FIG. 2 is a longitudinal cross-sectional view of a transmission similar to the structure of FIG. 1, although the synchronizer clutches have been replaced by servo operated disc clutches.

FIG. 3 is a longitudinal cross-sectional view of an alternate transmission mechanism embodying features that are common to the structures of FIGS. 1 and 2 although the synchronizer clutches and the power shift clutches of FIGS. 1 and 2 have been replaced by manually operated dog clutches.

PARTICULAR DESCRIPTION OF THE INVENTION

Figure 1B:
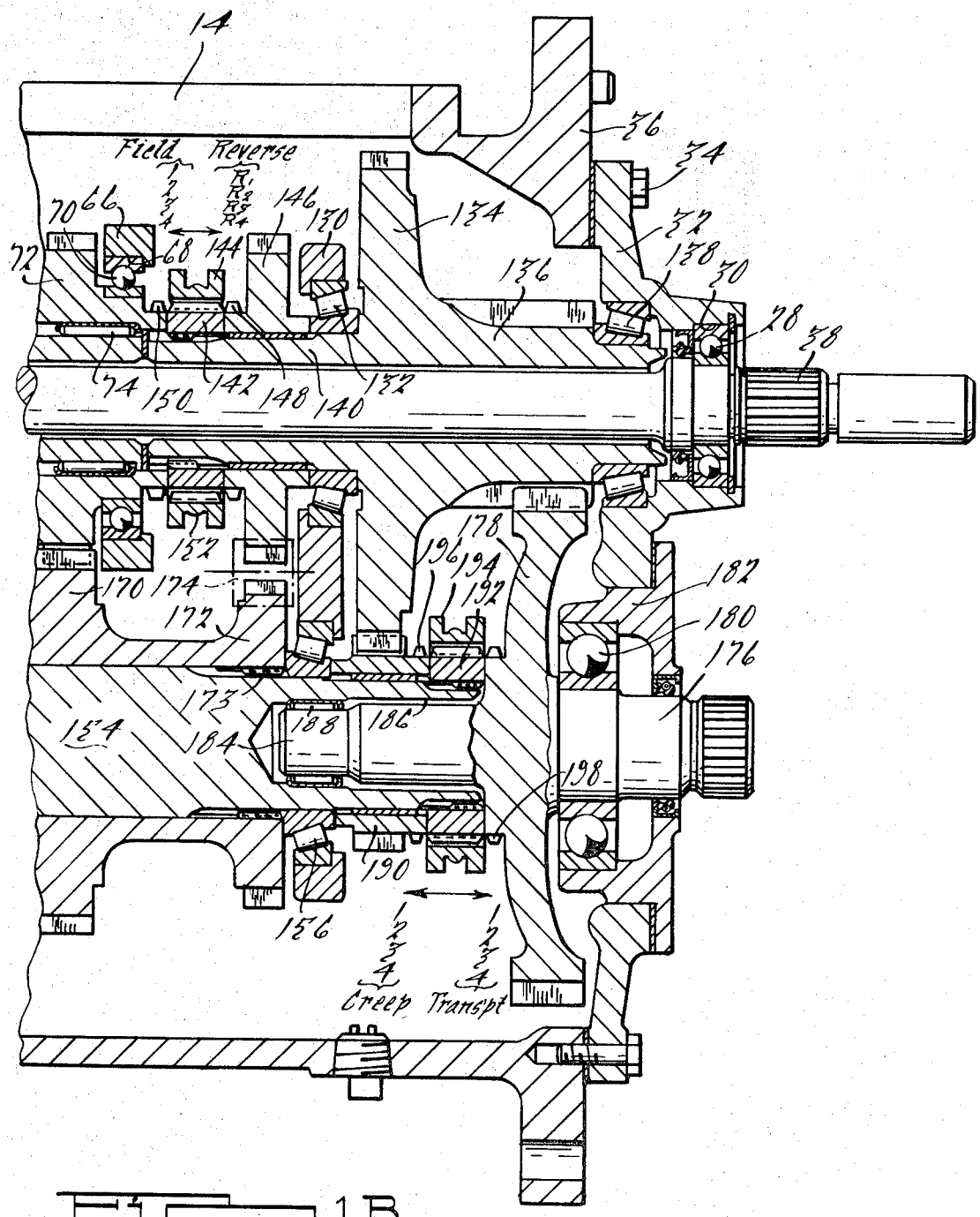
FIG. 1 shows in longitudinal cross section form transmission assembly embodying improvements in my invention wherein ratio changes are accomplished by means of synchronizer clutches.

Numeral 10 designates a transmission housing having a main clutch portion 12 and a main gear portion 14. The housing 12 is provided with a bolt flange 16 which may be bolted to the engine block of an engine such as a compression ignition engine in an agricultural or industrial tractor vehicle driveline.

The engine includes a crankshaft which is bolted by means of bolts 18 to the center of a flywheel 20. The hub of the flywheel shown at 22 is splined at 24 to a power takeoff shaft 26 which extends axially through the transmission assembly. It is supported at its right-hand end, as shown in FIG. 1, by means of a bearing 28 received within a bearing opening 30 formed in a bearing support plate 32. This plate is bolted by bolts 34 to an end flange 36 formed on housing portion 14. The shaft 26 is splined at 38 to permit a driving connection with suitable auxiliary equipment with which the tractor is used.

The housing portion 12 and the housing portion 14 are separated by a housing wall 40 which is bolted at its margin to internal flange 42 formed in housing 10. The wall 40 is provided with an internal sleeve 46 which supports a clutch throwout bearing 44. The bearing 44 is slidably positioned on a stationary sleeve shaft 46 carried by the support plate 40. Journaled inside the sleeve shaft 46 is a clutch output shaft 48 which is supported by bearing 50 located in the hub 22 of the flywheel. Shaft 48 is splined at 51 to permit a driving engagement between a friction disc neutral clutch, shown in dotted lines, which would be situated within the housing portion 12. The clutch structure includes a friction disc 51 which engages friction surface 52 on flywheel 20 when the clutch is engaged, thereby establishing a driving connection between the crankshaft and the sleeve shaft 48.

A conventional clutch operating lever 54 is mounted in the housing portion 12 for oscillation about an axis 56. The operating end 58 of the lever 54 disengages the bearing 44 so that the latter can be adjusted axially along the support sleeve shaft 46. As the bearing 44 is shifted in a left-hand direction, it engages clutch release levers that cause the friction disc to be disengaged from the flywheel. As bearing 44 is shifted in a right-hand direction, clutch springs in the clutch assembly engage the friction disc against the flywheel surface 52.

A transmission main shaft is shown at 60. It is journaled at its left-hand end by bearing 62 supported by the plate 40. The left-hand end of the shaft 60 is splined at 64 to the right-hand end of the clutch output shaft 48.

A transmission center support 66 is located within the housing portion 14 and forms a part thereof. It is formed with a bearing opening 68 in which is positioned a support bearing 70. This journals rotatably a power output gear 72. The right-hand end shaft 60 is journaled within a central opening in the gear 72 by means of bearing assembly 74.

Another main gear 76 is journaled on the main shaft 60 by means of a bushing. It is formed with clutch element 78 having external clutch teeth. In similar fashion gear 72 is formed with clutch element 80 having external clutch teeth. The synchronizer clutch hub 82 is splined at 84 to the shaft 60. A clutch sleeve 86 is slidably positioned on the hub 82. It may be moved in either axial direction into meshing engagement with a clutch element 78 or the clutch element 80, thereby establishing a driving connection between shaft 60 and the gears 76 and 72, respectively.

An internal cone clutch element 88 is drivably connected to the external teeth of the clutch element 80, and a corresponding cone clutch element 90 is drivably connected to the external teeth of clutch element 78. The clutch elements 88 and 90 are situated in juxtaposition, and they each are adapted to register with the external cone clutch surfaces of clutch elements 92 and 94, respectively. A series of solid and bipartite synchronizer pins 96 carries the clutch elements 94 and 92 at their opposite ends, thereby forming a unitary, shiftable, clutch assembly. Shifting movement of this assembly is effected by the lost motion connection between the sleeves 86 and the pins 96. The pins 96 are formed with a groove 98 which registers with a surrounding shoulder such as that shown at 100 formed in openings in the sleeve 86. The outer margin of the sleeve 86 is formed with a groove which receives the arms of the shift fork assembly 102.

Half of the pins 96 are bipartite in form, each part being urged into engagement with the shoulder 100 in its cooperating opening by means of a leaf spring 104 located internally as indicated in FIG. 1.

As the sleeve 86 is shifted in a left-hand direction, the detent action established by the unyieldable shoulder 100 of the solid pins 96 urge the clutch element 94 into clutching engagement with clutch element 90 thereby tending to establish synchronism between the motion of the shaft 60 and the motion of the gear 76. After synchronism is established, the sleeve 86 is shifted in its left-hand direction so that the internal teeth of the sleeve 86 engage the external teeth of the clutch element 78 without clashing.

As the sleeve 86 is shifted in a right-hand direction, the corresponding synchronizing action occurs. Shifting movement of the sleeve 86 in a right-hand direction will be accompanied by a detent force that causes the clutch element 92 to frictionally engage the clutch element 88, thereby establishing synchronism between the motion of the shaft 60 and the motion of the gear 72 prior to clutching engagement of the teeth of the sleeve 86 with the external teeth of the clutch element 80.

A third main torque transmitting gear 106 is journaled also on the shaft 60. A power input gear 108 also is journaled on the shaft 60 in spaced relationship with respect to the gear 106. Gear 106 is formed with a clutch element 110 having external clutch teeth, and gear 108 is formed with a corresponding clutch element 112 also having external teeth. Synchronizer clutch hub 114 is splined to the shaft 60.

A hub 114 forms a part of a synchronizer clutch assembly that includes also cone clutch elements 116 and 118 which establish synchronism in the motion of the shaft 60 with respect to the motion of the gear 108. It includes also cone clutch elements 120 and 122 which establish synchronism in the motion of the shaft 60 with respect to the motion of the gear 106 as the gear 106 is connected to the shaft 60.

The clutch elements 116 and 120 are carried by a set of solid and bipartite synchronizer pins 124 which extend through the apertures formed in the clutch sleeve 126. The arms of the shift fork 128 engage an annular groove formed in the margin of the sleeve 126. Sleeve 126 is formed with internal clutch teeth slidably positioned on the external teeth of the hub 114. The sleeve teeth engage the clutch elements 110 or 112, depending upon the direction in which it is shifted.

Another internal bearing support wall 130 is provided with a bearing opening that receives bearing assembly 132. This journals rotatably a first main gear 134. Shown integrally with the main gear 134 is the smaller pitch diameter main gear 136, which is journaled by means of bearing 138 in a bearing opening formed in bearing support plate 32. A sleeve shaft 140 is connected to gear 134 and 136 surrounding the power takeoff shaft 26.

The clutch hub 142 is splined to the shaft 140. It is formed with internal teeth which register with the external teeth of clutch sleeve 144. Situated between the hub 142 and the bearing 132 is a reverse gear 146. It is journaled on the shaft 140, and it carries external clutch teeth 148 situated directly adjacent the external teeth of the hub 142. Other external clutch teeth 150 are carried by the gear 72. The teeth 150 and 148 are adapted to engage the internal teeth of the sleeve 144 as the latter is shifted in one direction or the other, thereby establishing selectively a driving connection between the shaft 140 and the gears 72 and 146. The sleeve 144 is provided with a peripheral groove 152 which receives the arms of the shift fork, not shown.

A countershaft 154 is mounted rotatably in the transmission housing portion 14 in parallel disposition with respect to main shaft 60. Shaft 154 is journaled by a bearing 156 received in a bearing opening formed in the bearing support wall 130. The latter forms a part of the housing 14. The left-hand end of the shaft 154 is journaled by means of bearing 158 in a bearing opening formed in the bearing support wall 40. A plurality of external gear elements of decreasing pitch diameter is supported by the shaft 154 and is splined thereto for rotation in unison. A first countershaft gear 160, which is splined to the shaft 154 at 162, drivably engages the gear 108. The second and third countershaft gears 164 and 166 are formed in a cluster, and they are splined at 168 to the shaft 154. These gears engage respectively the main gears 106 and 76.

A fourth countershaft gear 170 engages drivably the main gear 72. It forms a part of a cluster which includes also reverse gear 172, the latter engaging a reverse drive pinion 174 which in turn engages the gear 146. Gears 170 and 172 are splined to the shaft 154 at 173.

An output drive assembly is situated at the rearmost end of the transmission mechanism. It includes a power output shaft 176 which carries an output gear 178 which in turn drivably meshes with gear 136. Shaft 176 and gear 178 are journaled by bearing 180 in a bearing opening formed in support plate 182. This in turn is bolted to the bearing support plate 32.

A gear mounting shaft 184 is received within an end opening 186 formed in shaft 154 and is journaled therein by bearing 188.

The right-hand end of the shaft 154 rotatably journals output gear 190. This meshes directly with gear 134. Situated directly adjacent the gear 190 is a clutch hub 192 having external teeth which engage internal teeth of clutch sleeve 194. External clutch teeth 196 are carried by the gear 190 directly adjacent the external teeth of the hub 192. In a similar fashion external teeth 198 are carried by the gear 178 directly adjacent the external teeth of the hub 192. The teeth 196 and 198 are engaged selectively by the teeth of the sleeve 194 as the latter is shifted in one direction or the other.

The mechanism shown in FIG. 1 is capable of establishing three forward-drive operating ranges. These may be identified as the transport range, the range of high speed ratios which may be used when the vehicle is operating with minimum resistance, a field operating range which is used when the vehicle is operating with a normal resistance, and a creeper operating range for use when resistance is unusually high.

To establish the field operating range, sleeve 144 is shifted in a left-hand direction into engagement with teeth 150. This establishes a driving connection between gear 72 and shaft 140. Having chosen the field operating range, the operator then can select any one of four ration shifts. The first ratio which produces maximum torque multiplication in that operating range is achieved by shifting the synchronizer clutch sleeve 126 in a left-hand direction, thereby establishing a driving connection between the clutch output shaft 48 and gear 108.

To establish field operation, sleeve 144 is shifted in a left-hand direction. The operator then can use the synchronizer clutches to establish various ratio changes. The first speed ratio in the field range is achieved by shifting clutch sleeve 126 in a left-hand direction thereby locking the shaft 60 to the gear 108. Torque is delivered then from shaft 48 to the gear 108, to the gear 160, through the countershaft 154 to the gear 170, through the gear 72, through the clutch sleeve 144, and through gears 136 and 178 to the shaft 176.

A synchronized ratio shift to the second speed ratio can be achieved by shifting sleeve 126 in a right-hand direction, thereby locking shaft 60 to the gear 106. Torque then is delivered to the countershaft 154 through the gears 106 and 164, rather than through the gears 108 and 160, thereby establishing an increased speed ratio.

The third speed ratio operation is achieved by shifting the synchronizer clutch sleeve 86 in a left-hand direction and returning the sleeve 126 to the neutral position shown in FIG. 1. Shaft 60 then becomes locked to gear 76. Torque is delivered, therefore, from the shaft 48 and through the gears 76 and 166 to the countershaft 154.

A shift to the fourth speed ratio is achieved by shifting the synchronizer clutch sleeve 86 in a right-hand direction, thereby locking the gear 72 to the shaft 60. Torque from the shaft 60 then is delivered through the shaft 80 and through the gears 72 and 170 to the countershaft 154.

Reverse drive is achieved by shifting the sleeve 144 in a right-hand direction, thereby locking the reverse gear 146 to the shaft 140. As torque is delivered to the countershaft 154 through the torque flow pattern described previously, reverse gear 172 is driven. This causes a counter rotation of the gear 146 because of the reversing motion imparted to it by the pinion 174. Gear 136 and gear 178 then drive the shaft 176 in a reverse direction.

A so-called creeper-drive ratio is achieved by moving the sleeve 144 to the neutral position shown in FIG. 1, thereby moving sleeve 194 in a left-hand direction, thus locking the gear 190 to the countershaft 154. The torque imparted to the countershaft 154 through the torque flow pattern described previously then is multiplied by the two pairs of gears shown at 190 and 134 and at 136 and 178, thus driving the shaft 176 at a reduced relative speed. All of the ratio shifts described previously can be accomplished while the final drive gearing is in the creeper-drive condition.

A so-called high-speed ratio transport condition is achieved by shifting the sleeve 194 in a right-hand direction, thereby locking the countershaft 154 directly to the output shaft 176. Gears 134 and 136 freewheel under these conditions.

In the embodiment shown in FIG. 2, the synchronizer clutch assemblies have been replaced by servo pressure operated disc clutches. In other respects the structure of FIG. 2 is the same as the structure of FIG. 1. For this reason the torque delivery elements in the FIG. 2 construction have been identified by the same reference numerals used in FIG. 1 although prime notations have been added.

In the FIG. 2 embodiment a cylinder drum 200 surrounds shaft 60' and is splined to it by means of a splined connection 202. The drum 200 defines a pair of annular cylinders 204 and 206. These receive, respectively, annular pistons 208 and 210. The outermost portion of the drum 200 is internally splined at 212 and 214 to which pressure rings 216 and 218, respectively, are secured.

Gear 76' is provided with an externally splined clutch element 220 which carries internally splined clutch discs 222. These are situated adjacent externally splined clutch discs 224 carried by the splined portion 212.

Gear 72' is formed with an externally splined clutch element 226. Internally splined clutch discs 228 are carried by the element 226. These are situated adjacent externally splined clutch discs 230 carried by the internally splined portion 214 of the drum 200.

By pressurizing the annular cylinder 204, gear 76' can be connected directly to the shaft 60'. In this respect the clutch shown in part at 222 and 224 performs a function that is similar to the synchronizer clutch structure shown in part at 90 and 94.

By pressurizing annular cylinder 206 the clutch shown in part at 228 and 230 performs a function that is similar to the synchronizer clutch structure shown in part at 88 and 92.

By pressurizing annular cylinder 206 the clutch shown in part at 228 and 230 establishes a direct connection between shaft 60' and gear 72'.

A clutch structure substantially identical to the clutch structure associated with gears 76' and 72' can be used also for connecting and disconnecting gears 108' and 106' with respect to the shaft 60'.

The mode of operation and the shift sequence for the FIG. 2 construction is the same as that described in reference FIG. 1. This will not be repeated here. Neither will a particular description of the fluid pressure operated disc clutch associated with the gears 108' and 106'.

FIG. 3 shows an embodiment in which the synchronizer clutches are removed and replaced by simple sliding clutch sleeves which establish and disestablish connections between gears 108'', 106'', 76'' and 72'' with respect to the main shaft 60''. In the FIG. 3 embodiment, the reference numerals used to identify the torque delivery elements are the same as those used to describe counterpart elements in the FIG. 1 construction although double prime notations have been added.

Clutch sleeve 126'' in the FIG. 3 construction is a counterpart for the sleeve 126 in the FIG. 1 construction. It may be moved in either axial direction to establish a driving connection between the gears 108'' and 106'' with respect to the shaft 60''. The corresponding clutch sleeve for the gears 76'' and 72'' is shown at 86''. This forms a counterpart for the sleeve 86 in the FIG. 1 construction.

With the arrangements shown in FIG. 3, it is difficult to change ratios while the vehicle is moving, and in this respect the operating performance range for the vehicle under varying loads might be more limited.

When employing the basic gearing arrangement disclosed in FIG. 1, 2 and 3, it is possible to interchange one clutch arrangement for another depending upon which operating conditions are present. But in each of the three embodiments it is possible to achieve four forward-driving ratios for each of the operating ranges that are chosen, namely, the creeper range, the transport range, the field range and the reverse range.

We Claim:

1. A multiple ratio power transmission mechanism adapted to deliver torque from an engine to a power output shaft comprising a main shaft, means for establishing a driving connection between the engine and the main shaft, a plurality of torque delivery gears driven rotatably about the axis of the main shaft, said gears having discrete pitch diameters that are relatively evenly stepped from the maximum to the minimum, a countershaft mounted for rotation about its axis in parallel disposition with respect to the main shaft, a plurality of countershaft gears secured drivably to said countershaft, each countershaft gear being in meshing engagement with the first named torque delivery gears, final drive cluster gears mounted for rotation about an axis that is common to the axis of said main shaft, a first output gear connected to said output shaft, said first output gear being in meshing engagement with one of said final drive cluster gears, a second output gear journaled for rotation about the axis of the countershaft and situated in meshing engagement with a second of said final drive cluster gears, first selectively engageable range selector clutch means for connecting selectively said output shaft to said countershaft and connecting said countershaft to said second output gear, and second selectively engageable range selector clutch means for connecting said final drive cluster gears to one of said main torque delivery gears.

2. A multiple ratio power transmission mechanism adapted to deliver torque from an engine to a power output shaft comprising a main shaft, means for establishing a driving connection between the engine and the main shaft, a plurality of torque delivery gears driven rotatably about the axis of the main shaft, said gears having discrete pitch diameters that are relatively evenly stepped from the maximum to the minimum, a countershaft mounted for rotation about its axis in parallel disposition with respect to the main shaft, a plurality of countershaft gears secured drivably to said countershaft, each countershaft gear being in meshing engagement with the first named torque delivery gears, final drive cluster gears mounted for rotation about an axis that is common to the axis of said main shaft, a first output gear connected to said output shaft, said first output gear being in meshing engagement with one of said final drive cluster gears, a second output gear journaled for rotation about the axis of the countershaft and situated in meshing engagement with a second of said final drive cluster gears, first selectively engageable range selector clutch means for connecting selectively said output shaft to said countershaft and connecting said countershaft to said second output gear, second selectively engageable range selector clutch means for connecting said final drive cluster gears to one of said main torque delivery gears, a reverse gear journaled for rotation about the axis of said final drive cluster gears, a second reverse gear drivably connected to said countershaft, and a reverse pinion meshing with both of said reverse drive gears, said second range selector clutch means being adapted to connect said first reverse drive gear directly to said final drive cluster gear.

3. The combination as set forth in claim 1 wherein said torque delivery gears are four in number, first selectively engageable clutch means for connecting separately the smallest and the nest smallest torque delivery gear to said main shaft and second selectively engageable clutch means for connecting selectively the third smallest and the fourth smallest torque delivery gear to said main shaft whereby four forward driving speed ratios are available for each operating range selected by said first and second range selector clutch means.

4. The combination as set forth in claim 2 wherein said torque delivery gears are four in number, first selectively engageable clutch means for connecting separately the smallest and the next smallest main torque delivery gear to said main shaft and second selectively engageable clutch means for connecting selectively the third smallest and the fourth smallest torque delivery gear to said main shaft whereby four forward driving speed ratios are available for each operating range selected by said first and second range selector clutch means.